(12) United States Patent
Mather et al.

(10) Patent No.: US 7,705,098 B2
(45) Date of Patent: Apr. 27, 2010

(54) CROSSLINKED POLYCYCLOOCTENE

(75) Inventors: Patrick T. Mather, Storrs, CT (US); Changdeng Liu, Storrs, CT (US); Seung B. Chun, Pomfret Center, CT (US); E. Bryan Coughlin, Amherst, MA (US)

(73) Assignee: University of Connecticut, Farmington, CT (US)

( * ) Notice: Subject to any disclaimer, the term of this patent is extended or adjusted under 35 U.S.C. 154(b) by 0 days.

(21) Appl. No.: 12/480,957

(22) Filed: Jun. 9, 2009

(65) Prior Publication Data

US 2009/0275704 A1    Nov. 5, 2009

Related U.S. Application Data

(62) Division of application No. 11/651,276, filed on Jan. 9, 2007, now Pat. No. 7,563,848, which is a division of application No. 10/683,559, filed on Oct. 10, 2003, now Pat. No. 7,173,096.

(60) Provisional application No. 60/418,023, filed on Oct. 11, 2002, provisional application No. 60/419,506, filed on Oct. 18, 2002, provisional application No. 60/488,323, filed on Jul. 18, 2003.

(51) Int. Cl.
    *C08F 4/00*  (2006.01)
    *C08F 32/04* (2006.01)

(52) U.S. Cl. .................. 526/171; 526/90; 526/135; 526/308; 525/98; 525/131; 525/216; 525/231; 525/240; 525/241; 525/387

(58) Field of Classification Search .................. 526/90, 526/135, 171, 308; 525/98, 131, 216, 231, 525/240, 241, 387
    See application file for complete search history.

(56) References Cited

U.S. PATENT DOCUMENTS

| | | | |
|---|---|---|---|
| 3,383,336 A | 5/1968 | Kuyama et al. | |
| 3,459,725 A | 8/1969 | Natta et al. | |
| 3,563,973 A | 2/1971 | Arditti et al. | |
| 4,612,241 A | 9/1986 | Howard, Jr. | |
| 4,755,552 A | 7/1988 | Jadamus et al. | |
| 5,145,935 A | 9/1992 | Hayashi | |
| 5,147,385 A | 9/1992 | Beck et al. | |
| 5,163,952 A | 11/1992 | Froix | |
| 5,189,110 A | 2/1993 | Ikematu et al. | |
| 5,258,020 A | 11/1993 | Froix | |
| 5,278,237 A | 1/1994 | Kita | |
| 5,282,854 A | 2/1994 | Yagi et al. | |
| 5,395,882 A | 3/1995 | Siol et al. | |
| 5,461,114 A | 10/1995 | Kita | |
| 5,506,300 A | 4/1996 | Ward et al. | |
| 5,607,467 A | 3/1997 | Froix | |
| 5,665,822 A | 9/1997 | Bitler et al. | |
| 5,674,242 A | 10/1997 | Phan et al. | |
| 5,728,785 A | 3/1998 | Grubbs et al. | |
| 5,769,883 A | 6/1998 | Buscemi et al. | |
| 5,880,240 A | 3/1999 | Tsuno | |
| 5,889,118 A | 3/1999 | Delgado et al. | |
| 5,908,918 A | 6/1999 | Chen et al. | |
| 5,910,357 A | 6/1999 | Hachisuka et al. | |
| 5,954,744 A | 9/1999 | Phan et al. | |
| 5,964,744 A | 10/1999 | Balbierz et al. | |
| 6,024,764 A | 2/2000 | Schroeppel | |
| 6,086,204 A | 7/2000 | Magnante | |
| 6,156,842 A | 12/2000 | Hoenig et al. | |
| 6,160,084 A | 12/2000 | Langer et al. | |
| 6,217,609 B1 | 4/2001 | Haverkost | |
| 6,248,129 B1 | 6/2001 | Froix | |
| 6,368,346 B1 | 4/2002 | Jadhav | |
| 6,388,043 B1 | 5/2002 | Langer et al. | |
| 6,395,038 B1 | 5/2002 | Schroeppel | |
| 6,530,950 B1 | 3/2003 | Alvarado et al. | |
| 6,538,089 B1 | 3/2003 | Samra et al. | |
| 6,679,605 B2 | 1/2004 | Zhou et al. | |
| 6,713,154 B1 | 3/2004 | Tsunogae et al. | |
| 6,720,402 B2 | 4/2004 | Langer et al. | |
| 6,852,825 B2 | 2/2005 | Lendlein et al. | |
| 6,858,680 B2 | 2/2005 | Gunatillake et al. | |
| 7,173,096 B2 | 2/2007 | Mather et al. | |

(Continued)

FOREIGN PATENT DOCUMENTS

EP    0343442    5/1989

(Continued)

OTHER PUBLICATIONS

JP 11154420 Abstract Only, Jun. 8, 1999 (1 page).
JP 11302493 Abstract Only, Nov. 2, 1999 (1 page).
JP 2232212 Abstract Only, Sep. 14, 1990 (1 page).
JP 2258817 Abstract Only, Oct. 19, 1990 (1 page).
JP 3068610 Abstract Only, Mar. 25, 1991 (1 page).
JP 3068611 Abstract Only, Apr. 2, 1992 (1 page).
JP 4100831 Abstract Only, Apr. 2, 1992 (1 page).
JP 62192440 Abstract Only, Aug. 24, 1987 (1 page).
JP 61231051 Abstract Only, Oct. 15, 1986 (1 page).
JP 63145325 Abstract Only, Jun. 17, 1988 (1 page).
JP 63179955 Abstract Only, Jul. 23, 1988 (1 page).
JP 8301952 Abstract Only, Nov. 19, 1996 (1 page).
Jp 9235329 Abstract Only, Sep. 9, 1997 (1 page).
JP 2000319423 Abstract Only, Nov. 21, 2000 (1 page).

(Continued)

*Primary Examiner*—Helen L. Pezzuto
(74) *Attorney, Agent, or Firm*—Cantor Colburn LLP

(57) ABSTRACT

Chemically crosslinked polycyclooctene having excellent shape recovery properties is prepared by ring-opening metathesis polymerization of cis-cyclooctene followed by chemical crosslinking. The crosslinked polycyclooctene can be shaped, the shape memorized, a new shape imparted with the original shape being recoverable by suitable temperature adjustment. The dependence of shape memory characteristics on degree of crosslinking was established. In addition to polycyclooctene, blends thereof with other materials such as SBR, EVA, polyurethane rubbers, and inorganic fillers can be utilized to provide chemically crosslinked products having excellent and tailored shape memory properties.

23 Claims, 9 Drawing Sheets

U.S. PATENT DOCUMENTS

| | | | |
|---|---|---|---|
| 7,563,848 | B2 | 7/2009 | Mather |
| 2002/0007222 | A1 | 1/2002 | Desai |
| 2002/0015519 | A1 | 2/2002 | Tokas et al. |
| 2002/0137864 | A1 | 9/2002 | Tong |
| 2003/0060530 | A1 | 3/2003 | Topolkaraev et al. |
| 2003/0060793 | A1 | 3/2003 | Topolkaraev et al. |
| 2003/0114777 | A1 | 6/2003 | Griffin et al. |
| 2003/0147046 | A1 | 8/2003 | Shadduck |
| 2003/0191276 | A1 | 10/2003 | Lendlein et al. |
| 2004/0014929 | A1 | 1/2004 | Lendlein et al. |
| 2004/0015187 | A1 | 1/2004 | Lendlein et al. |
| 2004/0015261 | A1 | 1/2004 | Hofmann et al. |
| 2004/0024143 | A1 | 2/2004 | Lendlein et al. |
| 2004/0030062 | A1 | 2/2004 | Mather et al. |
| 2004/0100704 | A1 | 5/2004 | Shadduck |
| 2004/0116641 | A1 | 6/2004 | Mather et al. |
| 2004/0122174 | A1 | 6/2004 | Mather et al. |
| 2005/0010275 | A1 | 1/2005 | Sahatjian et al. |
| 2005/0216074 | A1 | 9/2005 | Sahatjian et al. |
| 2005/0245719 | A1 | 11/2005 | Mather et al. |
| 2006/0041089 | A1 | 2/2006 | Mather et al. |

FOREIGN PATENT DOCUMENTS

| | | |
|---|---|---|
| EP | 0385443 | 2/1990 |
| EP | 0368274 | 5/1990 |
| EP | 404004 A2 | 6/1990 |
| EP | 0422693 | 2/1991 |
| EP | 1000958 | 11/1998 |
| WO | WO 94/14890 | 7/1994 |
| WO | WO 95/26762 | 10/1995 |
| WO | WO 99/42147 | 8/1999 |
| WO | WO 99/42528 | 8/1999 |
| WO | WO 99/46327 | 9/1999 |
| WO | WO 00/10485 | 3/2000 |
| WO | WO 00/71554 | 11/2000 |
| WO | WO 01/07499 | 2/2001 |
| WO | WO 01/91822 | 12/2001 |
| WO | WO 02/39875 | 5/2002 |
| WO | WO 02/059170 | 8/2002 |
| WO | WO 02/083786 | 10/2002 |
| WO | WO 03/035743 | 5/2003 |
| WO | WO 03/084490 | 10/2003 |
| WO | WO 03/084491 | 10/2003 |
| WO | WO 03/088818 | 10/2003 |
| WO | WO 03/093341 | 11/2003 |
| WO | WO 2004/006885 | 1/2004 |
| WO | WO 2004/011525 | 2/2004 |
| WO | WO 2004/032799 | 4/2004 |
| WO | WO 2004/033515 | 4/2004 |
| WO | WO 2004/033539 | 4/2004 |
| WO | WO 2004/033553 | 4/2004 |
| WO | WO 2005/009523 | 2/2005 |

OTHER PUBLICATIONS

JP 2005102953 Abstract Only, Apr. 21, 2005 (1 page).
WO 9746633 Abstract Only, Dec. 11, 1997 (1 page).
WO 0046262 Abstract Only, Aug. 10, 2000 (1 page).
EP 0343442 Abstract Only, Nov. 29, 1989 (1 page).
Janiak et al., Metal Catalysts for the Vinyl Polymerization of Norbornene, Journal of Molecular Catalysis A: Chemical 166 (2001) 193-209.
Liu et al., Chemically Cross-Linked Polycyclooctene: Synthesis, Characterization and Shape Memory Behaviour, Macromolecules, vol. 35, No. 27, 31 (Dec. 31, 2002) XP002273474.
Patent Abstracts of Japan, vol. 0124, No. 05 (C-539) (Oct. 26, 1988) & JP 63 145325 A (Daiseru Hiyurusu KK), (Jun. 17, 1988) Abstract.
Patent Abstracts of Japan, vol. 0150, No. 01 (C-0793), (Jan. 7, 1991) & JP 2 255830 A (Teijin Ltd), Oct. 16, 1990) Abstract.
Database WPI, Section Ch, Week 199051, Derwent Publications LTD, Class A12 AN 1990-379940 XP002273475 & JP 02 274526 A (Nippon Zeon KK) (Nov. 8, 1990) Abstract.
Dinger et al, High Turnover Nos. with Ruthenium-Based Metathesis Catalysts, Advanced Synth. Catal. vol. 344, (Aug. 2002) p. 671-677, XP 002273581 p. 673, lft-hand col, table 1.
Database Chemabs- Chemical Abstracts Service, (Oct. 19, 1985), Oh et al., Dynamic Mechanical Properties of Carbon Filled Trans-polyactenamer Vulcanizates, XP002273582.
Lendlein et al., Biodegradable, Elastic Shape-Memory Polymers for Potential Biomedical Applications Science (2002) 296, p. 1673-1676.
Nakayama, Properties and Applications of Shape-Memory Polymers, International Polymer Science and Technology 1991, 18, T/43-48.
Irie, Shape Memory Polymers, Cambridge University Press: Cambridge UK 1998, p. 203-219.
Boochathum et al., Vulcanization of Cis- and Trans-Polyisoprene and Their Blends: Crystallization Characteristics and Properties, European Polymer Journal, 37 (2001) p. 429-43.
Boochathum et al., Vulcanization of Cis- and Trans-Polyisoprene and Their Blends: Cure Characteristics and Crosslink Distribution, European Polymer Journ. 37 (2001) p. 417-427.
Schwab et al., Synthesis and Applications of RuCl2(=CHR')(PR3)2, The Influence of the Alkylidene Moiety on Metathesis Activity, J. Am. Chem. Soc. (1996) 118, p. 100-110.
Bielawski et al., Highly Effic. Ring-Open. Meta. Polym. (ROMP) Using New Ruth. Catal. Containing N-Hetero. Carb. Ligands, Agnew. Chem. Int. Ed. (2000) 39, No. 16, p. 2903-06.
Calderon et al., Melting Temperature of trans-Polyoctenamer, Journal of Polymer Science: Part A-2, vol. 5, (1967), p. 1283-1292.
Natta et al., The Monoclinic Structure of Even trans-Polyalkenamers, European Polymer Journal, vol. 3 (1967) pp. 339-352.
Bassi et al., The Triclinic Structure of trans-Polyoctenamer: European Polymer Journal, vol. 4, (1968), pp. 123-132.
Schneider et al., Crystallinity of trans-Polyoctenamer: Characterization and Influence of Sample History, Journal of Molecular Catalysis, 46 (1988), p. 395-403.
Yeh et al., Radiation-Induced Crosslinking: Effect on Structure of Polyethylene, Colloid & Polymer Sci. 263 (1985), pp. 109-115.
Fu et al., Nanoscale Reinforcement of Polyhedral Oligomeric Silsesquioxane (POSS) in Polyurethane Elastomer, Polymer Int. 49 (2000) pp. 437-440.
Ge and Mather, Synth. of Therm. Polyur. Bearing Nanost. Hard Segments: New Shape Memory Poly. Polymer Prog., Inst. of Mat. Sci. and Dept. of Engin., UConn (Jul. 2003), Abst.
Fu et al., Structural Development During Deformation of Polyurethane Containing Polyhedral Oligomeric Silsesquioxanes (POSS) Molecules, Polymer 42 (2001) p. 599-611.
Du Prez et al., Segmented Networks by Cationic Polymerization: Design and Applications NATO Sci. Ser. Ser. E. (1999) p. 75-98.
Goethals et al., Poly(Vinyl Ethers) as Building Blocks for New Materials, Macromol. Symp. (1998) 132, p. 57-64.
Kagami et al., Shape Memory Behaviors of Crosslinked Copolymers Containing Stearyl Acrylate Macromol. Rapid Commun. (1996), 17(8), pp. 539-543.
Kaneko et al., Shape Memory Gels with Multi-Stimuli-Responses, Proc. SPIE-Int. Soc. Opt. Eng. (1999) 3669, pp. 199-208.
Reyntjens et al., Polymer Networks Containing Crystallizable Poly(octadecyl vinyl ether) Segments for Shape-Memory Materials, Macromol, Rapid. Commun. (1999) 20(5), p. 251-255.
Jeon et al., Shape Memory and Nanostructure in Poly(norbornyl-POSS) Copolymers, Polymer International, 49, (2000), pp. 453-457.
Mather et al, Strain Recovery in Drawn POSS Hybrid Thermoplastics, XIIIth International Congress on Rheology, Cambridge, UK (2000), 4 pp. 53-55.
Lendlein et al., AB-Polymer Networks Based on Oligo($\epsilon$-caprolactone) Segments Showing Shape-Memory Properties Proc. Natl. Acad. Sci. USA (2001) 98(3), pp. 842-847.
Wei et al., Shape-Memory Materials and Hybrid Composites for Smart Systems, Journal of Materials Science 33, (1998) pp. 3743-3762.

Van Humbeeck, Shape Memory Alloys: A Material and a Technology, Advanced Engineering Materials, vol. 3, No. 11 (2001) pp. 837-850.

Kim et al., Polyurethane Ionomers Having Shape Memory Effects, Polymer, vol. 39, No. 13 (1998), p. 2803-2808.

Lin et al., Study on Shape-Memory Behavior of Polyether-Based Polyurethanes, I. Influence of the Hard-Segment Content, J. of App. Polymer Science, vol. 69 (1998) pp. 1563-1574.

Lin et al., Study of Shape-Memory Behavior of Polyether-Based Polyurethanes. II. Influence of Soft-Segment Molecular Weight, J. of App. Poly. Sci., vol. 69 (1998), p. 1575-86.

Chun et al., Enh. Dyn. Mech. and Shape-Mem. Prop. of a Poly(ethy. tereph.)-Poly(ethylene glycol) Copol. Cross. by Maleic Anhy., J. of App. Poly. Sci., vol. 83, (2002) p. 27-37.

Gajria et al., Miscibility and Biodegradability of Blends of Poly(Lantic Acid) and Poly(Vinyl Acetate), Polymer, vol. 37, (1996), p. 437-444.

Ishii, Shape Memory Resins, Trans-polyisoprene-based Shape Memory Resins, Zairyo Gijutsu (1989), 7(6), Abstract Only, 1 pg.

Lendlein et al., Shape-Memory Polymers, Agnew. Chem. Int. Ed. 41, (2002), p. 2034-2057.

Rousseau et al., Shape Memory Effect Exhibited by Smectic-C Liquid Crystalline Elastomers, J. Am. Chem. Soc., 125 (2003) pp. 15300-15301.

Liu et al., Shape Memory of Hydrogen-Bonded Polymer Network/ Poly(ethylene glycol) Complexes, Chengdu Instit. of Organ. Chem., Chinese Acad. of Sci., Dec. 30, 2003 (5pgs).

Mather et al., Strain Recovery in POSS Hybrid Thermoplastics, Polymer Preprints 41(1), (2000) pp. 528-529.

Oh et al., Dyn. Mech. Prop. of Carbon Black Filled Trans-Polyoctenamer Vulcanizates, Polymer (Korea), Pub. By the Poly. Soc. of Korea, V. 9, No. 4, 1985, Translation (27 pgs).

Jeong et al., Miscibility and Shape Memory Property of Poly(vinyl chloride)/Thermoplastic Polyurethane Blends, Journal of Materials Science 36 (2001) 5457-5463.

Jeong et al., Miscibility and Shape Memory Effect of Thermoplastic Polyurethane Blends with Phenoxy Resin, European Polymer Journal 37 (2001) 2245-2252.

Zhu et al., Shape-Memory Effects of Radiation Crosslinked Poly (ε-caprolactono), Journal of Applied Polymer Science, vol. 90, 1589-1595 (2003).

Yoshida et al., Devel. and Appl. of Shape-Memory Polymer Gel (Part I)-Synth. and Process. of Shape-Memory Polymer Gel, Hokkaldoritsu Kogyo Shikenjo Hokoku (1999) 298, Abstract.

Silsesquioxanos, Bridging the Gap Between Polymers & Ceramics, ChemFiles vol. 1, No. 6 (2001) (14 pgs).

Ramanathan et al., Polyurethane Urea, Polymer Data Handbook, New York: Oxford University Press (1999) pp. 878-881.

Ramanathan et al., Polyurethane Elastomers, Polymer Data Handbook, New York: Oxford University Press (1999) pp. 874-877.

Ramanathan et al., Polyurethane, Polymer Data Handbook, New York: Oxford University Press (1999), pp. 870-873.

Sung et al, Prop. of Segm. Poly(urethaneureas) Based on 2,4-Toluene Diisocy. 1. Therm. Trans., X-ray Studies and Comp. with Segm. Poly(urethanes), Macro., 13 (1980) p. 111-16.

Gupta et al., Effect of Solvent Exposure on the Properties of Hydroxy-Terminated Polybutadiene-Based Polyurethanes, Polym. Int. 52, (2003), p. 938-948.

Bielawski et al., Highly Effic. Synt. of Acetoxy- and Hydroxy-Term. Telechelic Poly(but.)s Using Ruthenium Catal. Contain. N-heterocyclic Ligangs, Poly., 42 (2001) pp. 4939-4945.

Sarbu et al., Synthesis of Hydroxy-Tefechelic Poly(methyl acrylate) and Polystyrene by Atom Transfer Radical Coupling, Macro., 37, (2004) pp. 9694-9700.

Mauler et al., Liquid-Crystalline Polyacrylate Crosslinked with α, ω Polyisoprene Diacrylate Segments, Polymer Bulletin, 41, (1998) pp. 291-297.

Sartomer Product Bulletin, Hydroxyl Terminated Polybutadiene Resins and Derivatives-Poly bd and Krasol, Sep. 2004, 40 pages.

Wache et al., Development of a Polymer Stent with Shape Memory Effect as a Drug Delivery System, Journal of Materials Science: Materials in Medicine, 14 (2003), pp. 109-112.

Valimaa et al., Viscoelastic Memory and Self-Expansion of Self-Reinforced Bioabsorbable Stents, Biomaterials, 23 (2002) pp. 3575-3582.

Suite of Shape-Memory Polymers, CHemical & Engineering, Feb. 5, 2001, 1 page.

Lee, Polymer Gel Based Actuator, Dynamic Model of Gel for Real Time Control, Mass. Institute of Tech., Dept. of Mechanical Engineering, May 1996, 120 pages.

Brochure, Degussa High Performance Polymers, The Rubber with Unique Properties, Vestenamer, Undated, 12 pages.

Gordon, Applications of Shape Memory Polyurethanes, Proceedings of the 1st Intern. Confer. on Shape Memory and Superelastic Technologies, SMST Intern. Comm. (1994) p. 115-199.

Liu et al., Thermomechanical Characterization of a Novel Series of Shape Memory Polymers, SPE ANTEC Proceedings (2002) 5 pages.

Dragutan et al., Controlling Stereoselectivity in Romp of Monocyclic Olefins Catalyzed by Tungsten-Based Systems, Polymer Preprints, 2001, 42(2) pp. 362-363.

Demonceau et al., Ruthenium-Catalysed Ring-Opening Metathesis Polymerization of Cyclolefins Initiated by Diazoesters, Journal of Molecular Catalysis 1992, 76(1-3), p. 123-132.

Larroche et al., J. Chem Soc., Chem. Commun., 1983, 5, pp. 220-221.

Sato et al., Ploymerization of 5-Substituted Cyclooctenes with Tungsten and Molybdenum Catalysts, J. Macromol. Sci.-Chem., 1977, A11(4), pp. 767-778.

International Search Report, International Application No. PCT/US03/32059, Mailing Date: Apr. 21, 2004 (2 pages).

International Search Report, International Application No. PCT/US03/32308, Mailing Date: Jun. 3, 2004 (2 pages).

International Search Report, International Application No. PCT/03/32329, Mailing Date: Apr. 1, 2004 (2 pages).

International Search Report, International Application No. PCT/US03/32138, Mailing Date: Mar. 31, 2004 (2 pages).

International Search Report, International Application No. PCT/US03/22898, Mailing Date: Nov. 6, 2003.

U.S. Appl. No. 11/204,517 to Patrick T. Mather, et al., filed Aug. 16, 2005.

JP1997309986 A, Publication Date: Dec. 2, 1997, Machine Translation, 38 pages.

JP2255830 A, Publication Date: Oct. 16, 1990, Machine Translation, 15 pages.

JP63145325 A, Publication Date: Jun. 17, 1988, Machine Translation, 4 pages.

JP4109133 A, Publication Date: Apr. 10, 1992, Machine Translation, 6 pages.

JP2000119465 A, Publication Date: Apr. 25, 2000, Machine Translation, 18 pages.

JP2002105247; Apr. 10, 2002; Caplus Abstract Only (1 pages).

JP2003292511A; Oct. 15, 2003; Machine Translation (23 pages).

W09805715; Feb. 12, 1998; Caplus Abstract Only (1 page).

W01998005715A1; Aug. 24, 1999; Machine Translation (53 pages).

JP 63145309; Jun. 17, 1988; Caplus Abstract Only (1 page).

JP 63145309; Jun. 17, 1988; Machine Translation (4 pages).

US 7,705,098 B2

CROSSLINKED POLYCYCLOOCTENE

CROSS-REFERENCE TO RELATED APPLICATIONS

This application is a division of and claims priority to U.S. patent application Ser. No. 11/651,276, filed Jan. 9, 2007, now U.S. Pat. No. 7,563,848 B2 which is a division of and claims priority to U.S. patent application Ser. No. 10/683,559, filed Oct. 10, 2003, now U.S. Pat. No. 7,173,096 B2 which in turn claims priority to the following provisional patent applications: Ser. No. 60/418,023, filed Oct. 11, 2002; Ser. No. 60/419,506, filed Oct. 18, 2002; and Ser. No. 60/488,323, filed Jul. 18, 2003. Each of the foregoing patent applications is incorporated herein by reference to the extent not inconsistent with present disclosure.

TECHNICAL FIELD

The present disclosure relates to shape memory polymer materials that can be fixed to a temporary or dormant shape under specific conditions of temperature and stress and at a later time, under thermal, electrical and/or environmental stimulus, the associated elastic deformation can be almost completely relaxed to the original, stress free condition. More particularly, the present disclosure relates to crosslinked polycyclooctene (PCO) and blends thereof having excellent shape recovery characteristics and especially a rapid rate of strain recovery. The present disclosure also relates to methods for preparation of the cross-linked polycyclooctene and to applications thereof.

BACKGROUND OF THE DISCLOSURE

Polymers intrinsically show shape memory effects, e.g., on the basis of rubber elasticity, but with varied characteristics of strain recovery rate, work capability during recovery, and retracted state stability. Among the first shape memory polymers (SMP) reported as such was crosslinked polyethylene, which was discovered and patented in 1971 by Radiation Applications, Inc. and a methacrylic acid ester reported by the Vernon-Benshoff Co. and used as a denture material. However, the mechanism of strain recovery for such materials was immediately identified as far different from that of the shape memory alloys (SMAs), based largely on nickel-titanium alloys.

A shape memory polymer is actually a super-elastic rubber; when the polymer is heated to a rubbery state, it can be deformed under resistance of ~1 MPa modulus, and when the temperature is decreased below either a crystallization temperature or a glass transition temperature, the deformed shape is fixed by the lower temperature rigidity while, at the same time, the mechanical energy expended on the material during deformation is stored. When the temperature is raised above the transition temperature ($T_m$ or $T_g$), the polymer will recover to its original form as driven by the restoration of network chain conformational entropy. The advantages of the SMPs will be closely linked to their network architecture and to the sharpness of the transition separating the rigid and rubber states. Compared with SMAs, SMPs have an advantage of high strain (to several hundred percent) because of the large rubbery compliance while the maximum strain of a SMA is less than 8%. An additional benefit of the SMPs is that the transition temperature can be tailored according to the application requirement; e.g., tuning the transition temperature as thermal sensors and the triggered strain recovery above a predetermined temperature, e.g., 37° C. for biomedical applications.

Numerous polymers have been found to have particularly attractive shape memory effect, most notably the polyurethanes, the polynorbornene, styrene-butadiene copolymers, and crosslinked polyethylene.

Block copolymers of polystyrene (PS) and trans-polybutadiene (TPB) with a minor PS content offer an alternative approach to shape memory with a distinct mechanism of strain fixation and recovery triggering. While microphase-separated domains of the PS block are amorphous with $T_g$~93° C., the continuous TPB phase is semicrystalline with $T_g$=−90° C. and $T_m$=68° C. Due to the immiscibility between PS and TPB blocks below 120° C., the copolymer forms a microdomain structure having elastic rheological characteristics above the TPB melting temperature, with the PS phase serving the role of physical crosslinking. Reversible deformations can therefore be fixed by crystallizing the TPB phase below about T=40° C. and recovered to the stress free state (shape memory) upon heating above 80° C. to melt the TPB phase and free the elastically deformed material to recover strain.

Another known semicrystalline shape memory polymer is trans-polyisoprene (TPI), having $T_m$=67° C., and degree of crystallinity near 40%, which readily undergoes crosslinking with peroxides. Below the $T_m$, the crosslinked TPI has a three dimensional network, which is connected by both chemical crosslinks and the crystalline regions. Above the $T_m$, the crystalline phase melts to become amorphous, with only the chemical crosslinks remaining to maintain the primary shape with a rubber-like modulus. This primary shape is the form of the material at the time of chemical crosslinking by peroxide cure, which normally occurs near T=145° C. for 30 minutes followed by cooling to room temperature, during which time crystallization occurs. As with the PS-TPB block copolymers, elastic deformation of crosslinked TPI can be carried out by heating the polymer above T=80° C. and this deformed secondary shape may be fixed by cooling-induced crystallization. The deformed shape returns to the primary form upon heating above 80° C.

In addition to the foregoing, copolymers of semicrystalline polycaprolactone (PCL) have been investigated as to their SMP characteristics. In particular, polycaprolactone diols have been difunctionalized with methacrylate end-groups and subsequently copolymerized with n-butyl acrylate. The polycaprolactone segments form a crystalline phase that can fix a secondary shape, while thermosetting leads to an elastic network that allows large reversible deformations above $T_m$. It was found that the PCL molecular weight controls the shape recovery temperature. It is believed that this is due to its influence on the melting transition, while n-butyl acrylate comonomer incorporation yields a softening effect due to the low glass transition temperature of poly (n-butyl acrylate) ($T_g$=−55° C.). It has been shown that the SMP based on polycaprolactone segments recovered their primary shape at 70° C. within 20 seconds, a relatively slow recovery.

SUMMARY OF THE DISCLOSURE

In accordance with the present disclosure, it has been found that chemically cross-linked polycyclooctenes (PCOs) synthesized from cis-cyclooctene have a high trans double bond content. This polymer can be chemically crosslinked with variations in crosslink density to form novel semicrystalline thermoset SMPs. The polymer synthesis is conducted via ring-opening metathesis polymerization of cyclooctene using a dihydroimidazolylidene-modified Grubbs catalyst. The PCO formed is cured by adding dicumyl peroxide to the PCO and the mixture compression molded into a film and further cured through chemical crosslinking upon heating. The effects on the thermal, mechanical, and microstructural properties of the synthesis product depends on the extent of crosslinking.

The advantageous polymers of the present disclosure exhibit excellent shape recovery characteristics and especially a rapid rate of strain recovery. The transition temperature of the PCO is tunable through the change of trans/cis ratio of vinylene groups and blending with miscible rubbers. A soft shape memory behavior is observed, where the primary stress-free shape was recovered within 1 second on immersion in hot water above the melting point of the crystalline PCO phase. In contrast with glassy shape memory polymers, chemically crosslinked PCO behaves as an elastomer capable of arbitrary shaping above the sharp melting temperature of the PCO crystalline phase and subsequent shape fixing during crystallization. The shape memory polymers of the present disclosure exhibit excellent shape recovery effect with the recovery temperature and retracting force being adjustable from 20° C. to 60° C. according to the ratio of the tacticity used, the degree of curing and the thermal properties of the blended components. The recovery can be finished within 1 second when heated 20° C. above the transition temperature. Additional advantages of the SMPs include that the materials are flexible at room temperature, the flexibility can be tailored according to application requirements by blending with either rigid particulate filler or soft polymeric rubber, they can be dyed to any color according to application requirements, and an optical clearing transition may accompany triggered strain recovery.

The present disclosure also includes shape memory polymers formed by blending the disclosed PCOs with other exemplary polymer materials, e.g., styrene-butadiene rubber, ethylene propylene-diene (EPDM) rubber, natural rubber (cis-polyisoprene), poly(ethylene-co vinyl acetate) (EVA), polydimethylsiloxane (silicone), and polyurethane polymers.

The PCOs and the blends of the present disclosure may be successfully used in connection with a wide variety of applications including, without limitation, the following applications:

a. Flexible catheters and guide wires
b. Artificial leather in which the material is colored suitably and embossed (attributes allowing this are appropriate stiffness, glossiness and ease of embossing)
c. Impression material for molding, duplication, rapid prototyping, dentistry, and inkless finger printing.
d. Toys, including but not limited to: action figures having arbitrary shapes and plastic boats with propeller triggered by hot water
e. Reversible embossing (surface structuring) for information storage
f. Reversible embossing (surface structuring) for pumping and valving in microfluidic devices
g. Mirror backing with wavefront distortion tailoring
h. Temperature sensors
i. Safety valves
j. Heat shrink tapes or seals
k. Flexible, custom couplings and fasteners
l. Gap filler, exploiting rubber, surface wetting and vacuum seals
m. Actuators
n. Medical impression materials for dentistry, orthopedics (cast fitting, for example), and podiatry (tailored orthotics).

DETAILED DESCRIPTION OF EXEMPLARY EMBODIMENTS

Figure 1:
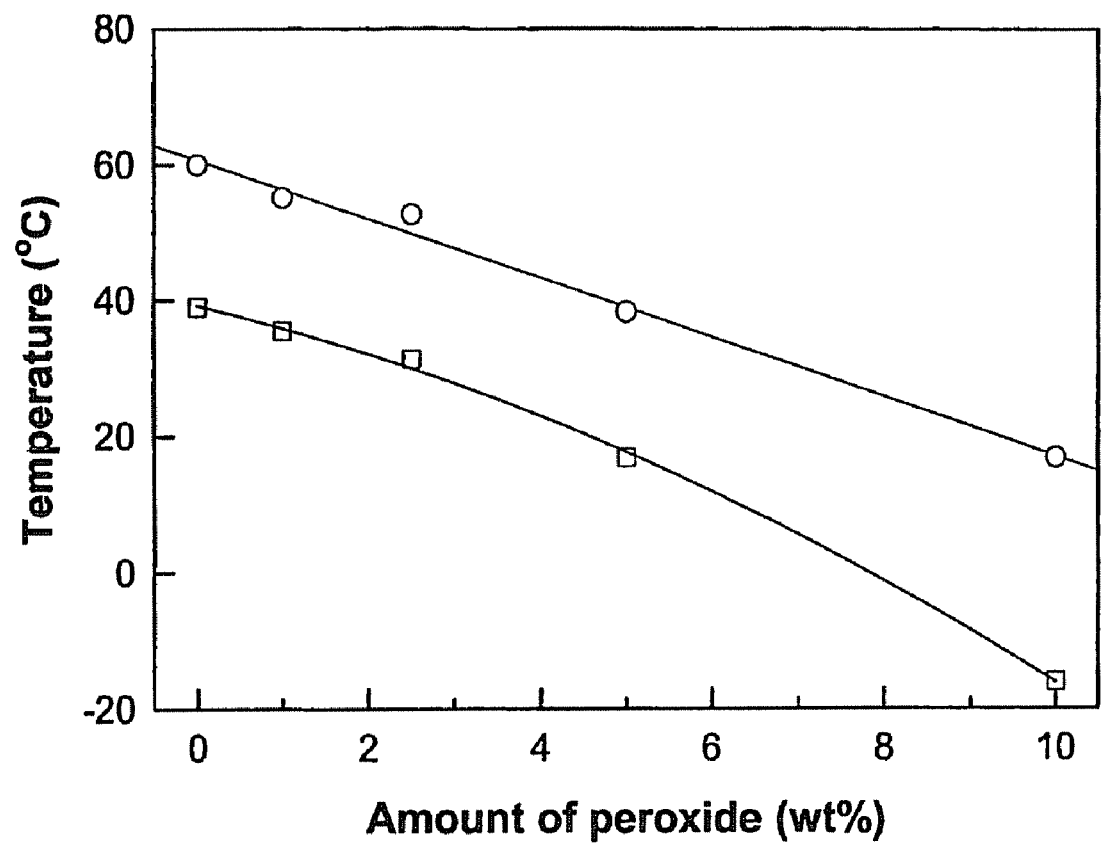
FIG. 1 illustrates the dependence of melting transition temperature (○) and crystallization temperature (□) for PCO cured with varying wt-% of dicumyl peroxide.

To illustrate advantageous features, functions and uses of exemplary polymers according to the present disclosure, the following non-limiting examples are provided. As will be readily apparent to persons of skill in the art, the following examples are merely illustrative of aspects of the present disclosure, and should not be viewed as absolute and thus should not be considered to be limiting with respect to potential polymeric materials, processing conditions (e.g., relative percentages, temperatures and time periods) and/or end-use applications that may be advantageously employed according to the present disclosure. Physical properties and processing conditions set forth in the following examples are merely illustrative of such properties/conditions, and should not be viewed as limiting the scope or utility of the present disclosure.

Materials and Synthesis.

The ruthenium catalysts bis(tricyclohexylphosphine)benzylidene ruthenium (IV) dichloride (1, Grubbs' catalyst) and tricyclohexylphosphine [1,3-bis(2,4,6-trimethylphenyl)-4,5-dihydroimidazol-2-ylidene] [benzylidene] ruthenium (IV) dichloride (2) were purchased from Strem Chemical. The other reagents were obtained from Aldrich and used as received unless otherwise indicated. The cis-cyclooctene was vacuum distilled from CaH$_2$ prior to use and the methylene chloride was passed through columns of basic activated alumina prior to use.

EXAMPLE

To a solution of 5.1 mg (6.0 μmol) of the ruthenium catalyst 2 in 50 mL of CH$_2$Cl$_2$, there was added 6.60 g (60 mmol) cis-cyclooctene. The resulting reaction mixture was stirred under air for 30 minutes at room temperature during which time the mixture gelled. The reaction was stopped by injection of 50 mL CH$_2$Cl$_2$ containing a trace amount of ethyl vinyl ether. The polymer was precipitated using methanol, recovered by filtration and dried overnight under vacuum at room temperature. The isolated yield amounted to 5.0 g (75%). The $^{13}$C NMR spectra of the sample were recorded in chloroform-d on a Bruker DPX-300 FT NMR spectrometer operating at 75 MHz. Quantitative spectra were obtained using a standard inverse-gated proton decoupling pulse sequence and a relaxation delay of 2 seconds to obtain trans/cis ratios. Gel permeation chromatography was carried out using a Polymer Lab LC1120 HPLC pump equipped with a Waters differential refractometer detector. The mobile phase was tetrahydrofuran (THF) and a flow rate of 1 mL/minute was employed. Separations were carried out using a set of 10$^5$ Å, 10$^4$ Å and 10$^3$ Å Polymer Lab columns. Molecular weights were calibrated against narrow molecular weight polystyrene standards.

The PCO peroxide curing was carried out by dissolving PCO and dicumyl peroxide in CHCl$_3$, to form a clear solution. The solution was dried in a fume hood at room temperature for 12 hours and vacuum dried in an oven at 40° C. for 12 hours. Dried PCO containing DCP was transferred to a mold having the following dimensions 1×3×0.05 cm. The mold was placed between two hot platens and compressed at 140° C. under a pressure of 1000 psi for 30 minutes to yield a sheet specimen. After curing, the specimen was cooled to room temperature in the mold.

The polymer blends were achieved via the melt blending within a twin screw Brabender. The Brabender which had 30 ml chamber was first heated to 80° C. (T$_m$+20° C.) and the speed was adjusted to 25 RPM. The feed (polymers to be blended) was premixed and fed into the chamber within 2 minutes and mixed therein at 25 RPM for 10 minutes. The resulting mixture was removed and cooled to room temperature under air. The mixture was then introduced between two plates that that had been preheated to 180° C., pressed to form a film and cured for 30 minutes. Two Mylar films were used to separate the polymers from the stainless plates to avoid the film sticking on the plates after curing. The thickness of the samples was controlled by a spacer, which also served as a sealer.

The thermal properties (melting and crystallization temperatures) of cured PCO were measured using a Perkin-Elmer differential scanning calorimeter (DSC-7) using a first heating rate of 10° C./minute from −50 to 100° C., a first cooling rate of −10° C./minute from 100° C. to −50° C., and a second heating rate of 10° C./min from −50 to 100° C.

Wide-angle x-ray scattering (WAXS) analysis was performed using a BRUKER GADDS-4 instrument having a Cr source of radiation (λ=2.291 Å) and the transmission mode was chosen. The voltage and the current used were 40 kV and 40 mA, respectively, and the exposure time was 30 minutes. The scattering patterns were collected on a HiStar area detector with the distance of the sample to detector set to 6.0 cm. Intensity profiles (I vs. 2θ) were determined from azimuthal averaging at each 2θ position of the isotropic patterns. The data were then analyzed with Peakfit™ software (SPSS Science) to find the peak positions and the relative intensity of each peak.

Dynamic mechanical analysis was carried out with a TA Instruments DMA 2980 run in tensile mode at an oscillation frequency of 1 Hz, a static force of 10 mN, an oscillation amplitude of 5.0 μm (~0.1% strain), and an automatic tension setting of 125%. Temperature ramps were conducted at 4° C./minute over the range −100<T<100° C.

The shape memory effect was then determined. PCO samples having varying crosslinking degrees were cut into rectangular strips of 0.5×2.0×30.0 mm and colored with red dye to provide optical contrast. The PCO strips were bent in semi-circular shape with an inner diameter of 0.737 cm in a warm water bath at 70° C. (at which temperature the samples were transparent and flexible) and then transferred into an ice water bath to fix the secondary bent shape by crystallization. The bent PCO samples were then promptly dipped into the warm water bath at 70° C., while recording images of shape recovery using a video camera at a rate of 20 frames per second. The variations of radius of curvature of the bent samples were analyzed using non-linear regression (Sigmplot™).

It was further established using the foregoing synthesis techniques that polycyclooctene (PCO) can be synthesized using either RuCl$_2$(=CHPh)(PCy$_3$)$_2$ 1 (Grubbs catalyst) or the dihydroimidazolylidene modified Grubbs catalyst 2, but with catalyst 2 having a much higher reactivity as compared with catalyst 1. A unique feature of PCO as a shape memory material is the tunable transition temperature (T$_m$ of PCO), where a temperature range from 19 to 61° C. is achievable following the dependence of the melting point of PCO on the trans content of double bonds along the polymer backbone. The synthesis procedure of the invention has the ability to control the trans/cis ratio as well as molecular weight by changing conditions: reaction time, catalyst type, and catalyst concentration. Table 1 which follows shows representative examples of PCO variations achieved in this manner.

TABLE 1

Molecular and Thermal Characteristics of PCO Polymers.

| Sample Code | Catalyst | Monomer: Catalyst Ratio$^a$ | Reaction Time (hr) | M$_w$ (kg/mol) | PDI | trans % | T$_m$$^b$ (° C.) |
|---|---|---|---|---|---|---|---|
| PCO1 | 1 | 500 | 2 | 127 | 1.55 | 68 | 41 |
| PCO2 | 1 | 1,000 | 2 | 194 | 1.65 | n.d. | 30 |
| PCO3 | 1 | 2,000 | 2 | 246 | 1.73 | n.d. | 19 |
| PCO4 | 1 | 1,000 | 19 | 183 | 1.64 | 78 | 55 |
| PCO5 | 2 | 10,000 | 0.5 | 315 | 2.00 | 81 | 60 |

$^a$Monomer concentration 1.2 M.
$^b$Data are gathered on the second melt scan with 10° C./min cooling history.

As can be appreciated from Table 1, higher catalyst concentrations result in higher trans concentration and lower molecular weights (sample 2 and 3 vs. 1). Additionally, prolonged reaction times (sample 4 vs. 2) or the use of highly reactive catalyst 2 (sample 5) yield higher melting temperature products, presumably as a consequence of more cross-metathesis occurring between polymer chains resulting in the thermodynamically more favorable trans products.

Sample 5 (PCO5 above) was selected for in-depth characterization, based upon its desirable melt transition temperature and molecular weight.

Thermal Analysis.

DSC analysis was conducted for the first heating and cooling of cured PCOs prepared using varying concentration (wt.

%) of peroxide: (i) DCP 0%, (ii) DCP 1%, (iii) DCP 2.5%, (iv) DCP 5%, and (v) DCP10% to reveal its melting and crystallization behavior. The neat PCO was compression molded in a hot press using the same conditions as for crosslinked PCO to provide an identical thermal history. During the first heating cycle, neat PCO shows a melting temperature at 60.3° C. while any glass transition for neat PCO was not detected over the range −50<T<100° C. According to Calderon and Morris, J. Polym. Sci., Polym. Phys. Ed. 1967, 5, 1283-1292, the crystalline melting point for PCO depends linearly on the percentage of trans-vinylene content in the polymer; specifically, $T_m$=60° C. was reported for 78% trans-vinylene content in PCO. For the neat PCO sample described herein, the content of trans-vinylene is 80.6%, so that the measured melting transition of 60.3° C. is in good agreement with the prior literature Calderon and Morris, supra. During the first cooling cycle, neat PCO shows a crystallization exotherm at 37° C. A second heating cycle shows the same result as the first heating cycle.

Crosslinking PCO with dicumyl peroxide has a dramatic impact on its crystallization and melting behavior. The melting point, $T_m$, the crystallization point, $T_c$, and the melting enthalpy (related to degree of crystallinity), ΔH, are plotted in FIG. 1 and summarized in Table 2 which follows:

TABLE 2

Thermal Characteristics of Cured PCO.

| Sample Code | Added Peroxide/% | Tm/° C. | Tc/° C. | ΔH/J g$^{-1}$ |
|---|---|---|---|---|
| PCO5-0 | 0 | 60.3 | 39.0 | 57.8 |
| PCO5-1 | 1 | 55.2 | 35.5 | 62.8 |
| PCO5-2.5 | 2.5 | 52.7 | 31.3 | 54.7 |
| PCO5-5 | 5 | 38.2 | 16.8 | 35.1 |
| PCO5-10 | 10 | 16.7 | −16.0 | 22.9 |

A significant effect of the degree of crosslinking is observed: both the $T_m$ and $T_c$ of PCO decrease as the amount of DCP increases, the former by more than 40° C. for 10% DCP crosslinking. The melting enthalpy also decreases with increased crosslinking, indicating a decrease in degree of crystallinity. When the temperature is decreased below $T_c$, the constituent PCO chains begin to crystallize, the crystals growing to a certain final size and shape. In the case of neat PCO (without cross-linking points), relatively low restriction for PCO crystal growth due to high polymer chain mobility results is to be expected. However, for the samples of increasing crosslink density, the polymer chains are constrained against diffusion and conformational rearrangement, thus increasingly restricting crystallization. As a result, higher peroxide loadings give rise to a reduced degree of crystallinity and concomitant reduction of crystal size, the latter inferred from the observed depression in melting temperature. It can also be seen from Table 2 that the melting temperature of cured PCO can be tailored by controlling the loading of peroxide before curing. Moreover, when the amount of peroxide exceeds 10%, the cured PCO shape memory behavior is lost as both the $T_m$ and $T_c$ are below room temperature and the melting transition is broadened excessively.

Crystalline Microstructure.

The underlying microstructure of PCO as affected by crosslinking was determined using wide-angle x-ray scattering (WAXS). From the intensity profiles of all PCO samples except the PCO5-10, it was found that the microstructure is characterized by the superposition of an amorphous halo and four crystalline diffraction rings of nearly constant d-spacing, but with intensity that decreases with increasing extent of crosslinking. For example, PCO cured with 1 wt-% dicumyl peroxide shows two strong scattering peaks at 2θ=30.02° (4.42 Å) and 34.81° (3.83 Å) that correspond to the 010 and 100/110 reflections of the PCO triclinic crystal structure, respectively. Additionally there are two weak peaks, 2θ=31.94° (4.16 Å) and 2θ=36.97° (3.61 Å) corresponding, respectively to the 110 and 201 reflections of the PCO monoclinic crystal structure.

The WAXS patterns were analyzed to deconvolute the constituent reflections using Peakfit™ software. The data obtained are summarized in Table 3, which follows along with a summary of DMA vide infra.

TABLE 3

Summary of the WAXS results.

| Sample Code | Peak Area % at 2θ = | | | | Degree of Crystallinity | E' at 28° C. (MPa) |
|---|---|---|---|---|---|---|
| | 30.02 | 31.94 | 34.81 | 36.97 | | |
| PCO5-0 | 11.25 | 0 | 12.44 | 1.84 | 25.5 | 173.4 |
| PCO5-1 | 9.85 | 0 | 11.77 | 2.21 | 23.8 | 136.1 |
| PCO5-2.5 | 7.78 | 0.39 | 7.85 | 2.03 | 18.1 | 128.1 |
| PCO5-5 | 7.38 | 0.39 | 7.53 | 2.04 | 17.3 | 67.7 |
| PCO5-10 | 0 | 0 | 0 | 2.64 | 2.6 | 8.4 |

From the fitted data, it was found that the degree of crystallinity of PCO is 25.5% at room temperature, which is close to the results from DSC (28.8%) employing the enthalpy data of a pure crystal (216 J/g) from Schneider and Muller *Journal of Molecular Catalysis* 1988, 46, 395-403. Additionally, the degree of crystallinity shows a monotonic decrease with increasing crosslinking, the same trend observed with DSC and also explained by a constraining effect of crosslinking points that limit the growth of crystals. In fact, sample PCO5-10 (10% DCP crosslinking) did not show significant crystallinity at room temperature; however, this does not mean that the sample cannot crystallize. From the DSC data, it can be concluded that a crystalline phase of PCO5-10 melts over the range −15<T<30° C., while the WAXS analysis was conducted at room temperature (28° C.). At this temperature the melting is nearly complete, yielding a measured degree of crystallinity of only 2.6%.

In analyzing the scattering patterns for the area % of each peak, it was found that the effect of crosslinking-confinement on the degree of crystallinity depends on the associated crystal structure. While the triclinic peaks at 30.02 and 34.8 degrees 2θ decrease linearly with crosslinking, the monoclinic peaks at 31.9 and 36.97 degrees 2θ seem almost unaffected by the crosslinking. It is thus apparent that the triclinic crystal structure is more sensitive to the constraining influence of cross-linking, while the monoclinic crystal structure is more robust, although still a minor component.

Dynamic Mechanical Properties.

Figure 2:
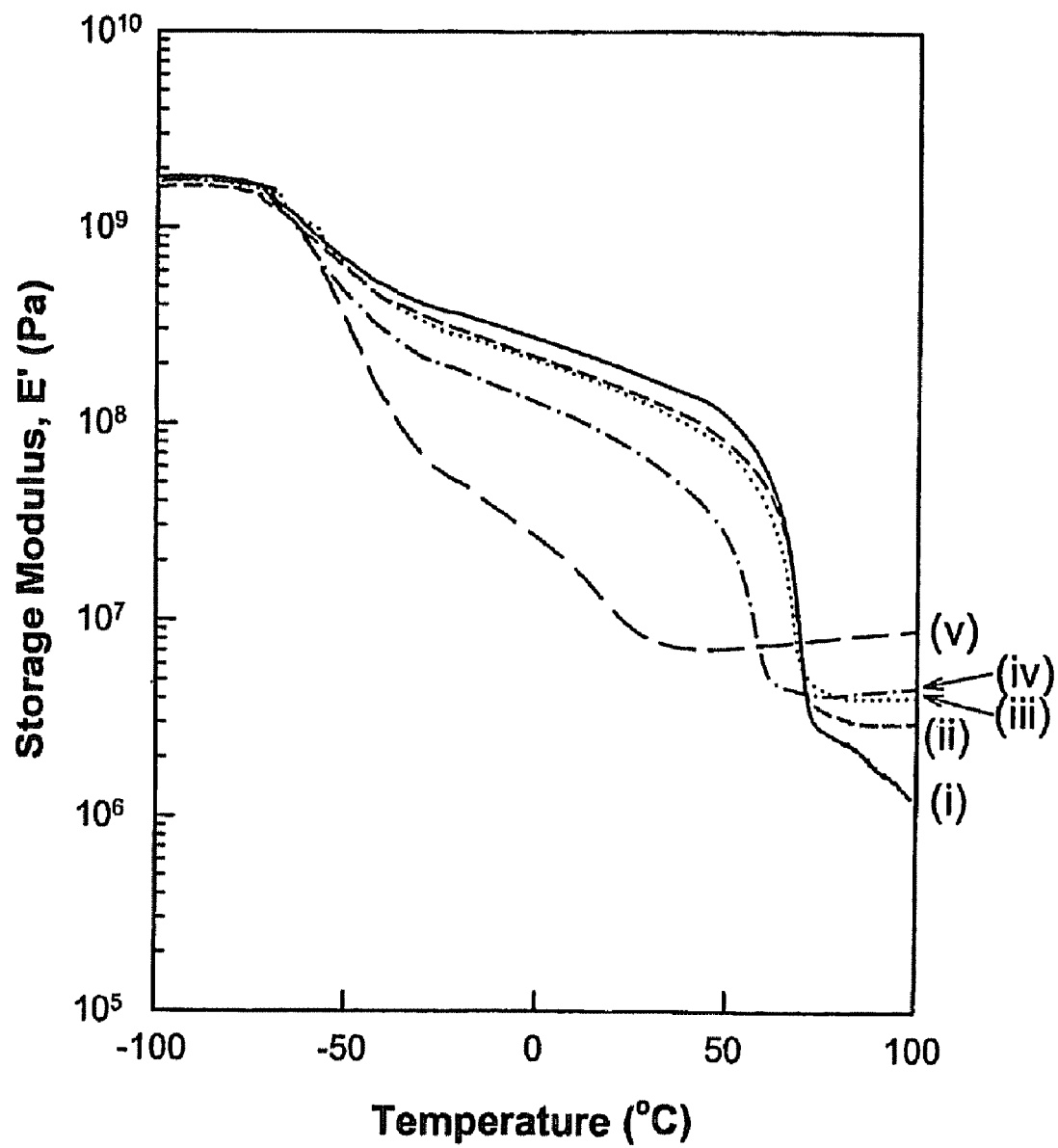
FIG. 2 illustrates the tensile storage modulus (E') vs. temperature for cured PCO, cured with varying wt-% of dicumyl peroxide (DCP) in a linear stress oscillation mode using 1 Hz of frequency and 4° C./min. of ramping rate at the following DCP wt-% levels: (i) DCP 0%, (ii) DCP 1%, (iii) DCP 2.5%, (iv) DCP 5%, and (v) DCP 10%.

Chemically crosslinking PCO also has a direct impact on the thermomechanical properties, e.g. modulus versus temperature, through the establishment of a permanent network and indirectly through the morphological transitions discussed above. Revealing such effects by the use of DMA, FIG. 2 shows plots of the tensile storage modulus (E') versus temperature for cured PCOs prepared with varying amounts of DCP. All of the PCO samples are characterized by a solid-like storage modulus (about 1.7 GPa) for temperatures below T=−70° C. with this modulus value being invariant to the crosslinking density. For temperatures above T=−70° C., the apparent onset of $T_g$ in the PCO samples, E' begins to decrease gradually to a level that is dependent on crosslink density, but spanning 0.05 to 0.5 GPa. The decrease in modulus with crosslinking in this temperature region can be understood from the results of the DSC and WAXS that showed crosslinking reduces the degree of crystallinity of PCO. It is to be expected that the crystalline phase will function as both the fixing mechanism for shape memory and a means of controlling room temperature modulus over a full order of magnitude. For temperatures nearing T=62° C., close to the melting temperature measured by DSC, the storage modulus of neat PCO begins to decrease sharply to about 2 MPa at the completion of melting at 71° C. As found with DSC, this transition temperature is observed mechanically to decrease with increasing degree of crosslinking. For temperatures greater than $T_m$, the modulus of neat PCO, trace (i), continues to decrease to a point where the material flows like a viscous liquid, not showing a persistent rubbery plateau (FIG. 2). This feature hampers the applicability of neat PCO for use as a shape memory polymer due to an inability to be deformed as a rubber above $T_m$ without rapid stress relaxation. On the other hand, cured PCO, which contains just 1% peroxide, represented by trace (ii), will allow significant shape memory effects owing to its persistent rubbery plateau above 72° C. As the amount of peroxide increases, the rubbery plateau modulus increases, allowing for enhanced mechanical energy storage, but the transition temperature and the steepness of the transition decrease. In the case of PCO with 10% DCP, PCO5-10, shown as trace (v) in FIG. 2, the thermomechanical response that is observed is inconducive to shape memory effects as the fixing (crystallization) temperature is lower than room temperature so that shape fixing would require subambient cooling and the temporary shape would be expected to drift via partial melting. In addition, the melting transition is too broad for dramatic strain recovery to take place.

Figure 3:
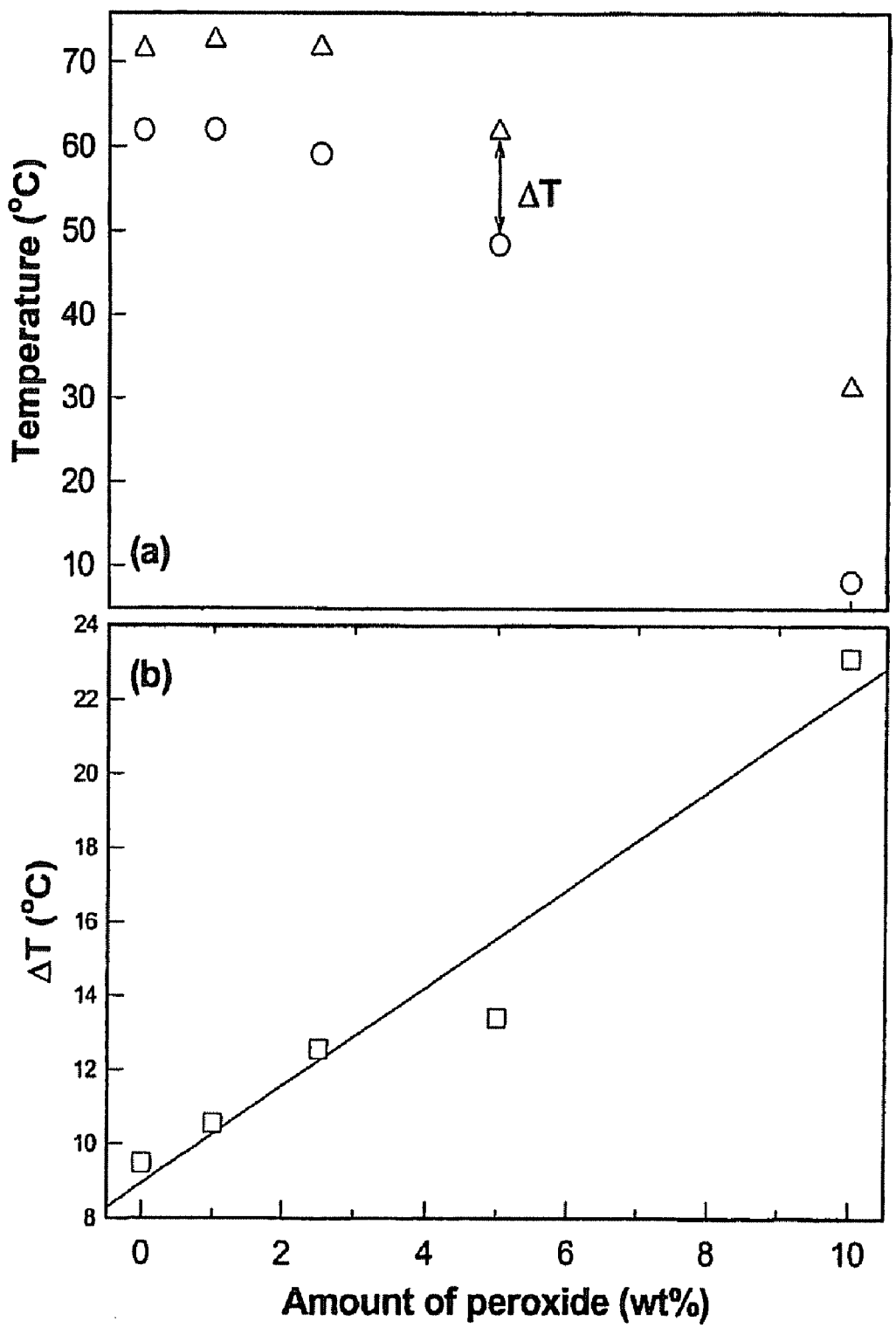
FIG. 3 illustrates: (a) dependency of amount of added peroxide on $T_1$ (○) and $T_2$ (Δ) which are the onset and the end temperatures of transition, respectively, determined from curves in FIG. 4; and (b) $\Delta T$ (□) vs. amount of added peroxide, where $\Delta T$ is the difference between $T_1$ and $T_2$.

From each of the curves in FIG. 2, the onset ($T_1$) and the end ($T_2$) temperatures of the melting transition were determined, recognizing that shape memory behavior would benefit from a small difference in $T_1$ and $T_2$. FIG. 3(a) depicts the influence of peroxide content on $T_1$ (○) and $T_2$ (△), noting that the onset of the temperature ($T_1$) corresponds closely to the melting point measured by DSC (Table 2). Both $T_1$ and $T_2$ decrease as the amount of peroxide increases similar to $T_m$ and $T_c$ in Table 2, but more so for $T_2$. FIG. 3(b) shows the difference in the onset and end transition temperatures, $\Delta T = T_2 - T_1$ (□), versus the amount of added peroxide; as the amount of peroxide increases, $\Delta T$ increases, indicating a loss in sharpness of the transition. The sharpness of this transition can be quantified by measuring the maximum slopes of the E'-Temp trace in the melting region of FIG. 2, and these results are shown in FIG. 3. Clearly, a compromise between transition sharpness (high for neat PCO) and rubber elasticity (low for neat PCO) exists so as to influence the design of an optimal shape memory polymer.

It was observed that the trend of the in thermomechanical behavior corresponds favorably with WAXS observations discussed above. In particular, it was found that the room temperature modulus decreases with increasing of crosslinking, just as the degree of crystallinity is decreasing as reported in Table 3.

Shape Memory Effect.

Figure 4:
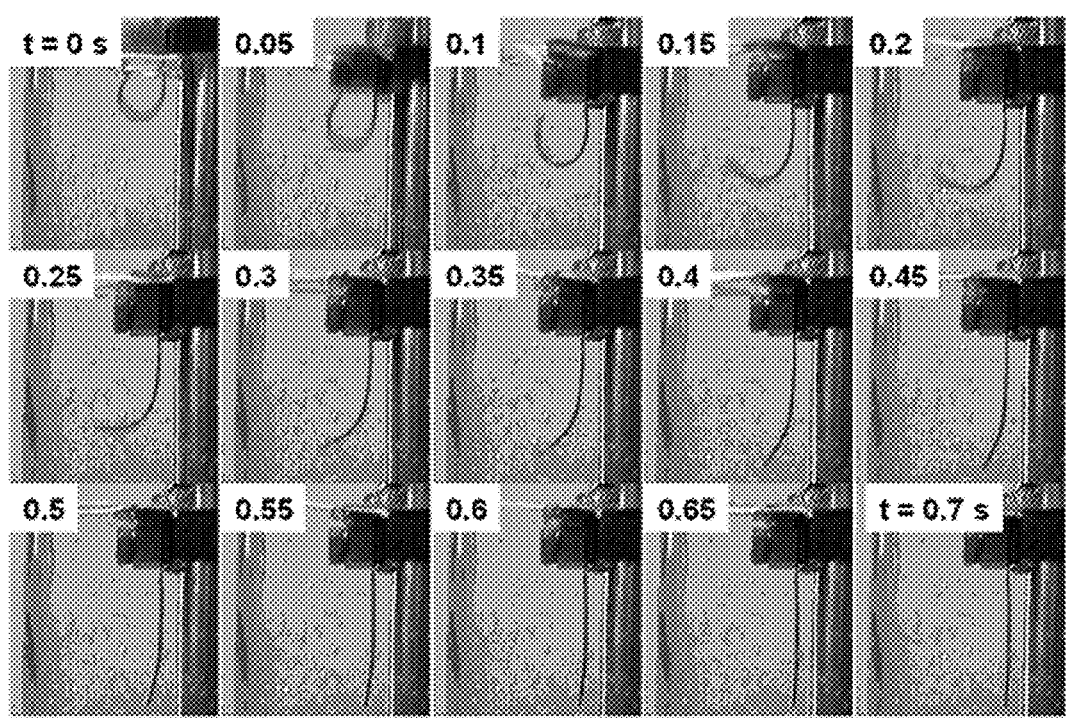
FIG. 4 illustrates the shape memory behavior of PCO with DCP 2.5% following rapid immersion in water at T=70° C. The exemplary sample undergoes transition from temporary shape (circular) to permanent (linear) within 0.7 sec.

A typical example of the shape-memory effect of PCO cured with 2.5 wt % DCP (PCO5-2.5) is shown in FIG. 4. The primary, stress free, shape of the sample under study was set at the crosslinking stage to be a linear rectangular bar (see FIG. 4 at t=0.7 s), while the secondary (temporary) shape was a semi-circular film curved along the long axis and having an inner diameter of 0.737 cm (see FIG. 4 at t=0 s). Such a shape was achieved by heating the sample to a transparent state at T=70° C., deforming it to a semi-circular shape using a pipette mandrel, and finally quenching the curved film in ice water, rendering the sample translucent white and leathery. The shape recovery was examined by rapidly submerging the curved sample into a water bath heated to T=70° C. As shown in FIG. 4, the transition from the secondary shape to the primary shape is completed within t=0.7 second. In contrast, an uncrosslinked sample, PCO5-0, does not show such outstanding shape fixing and recovery effects, a finding to have been anticipated from DMA results that revealed poor elasticity above the melting transition. Thus, tensile stress applied to the sample above the melting transition relaxes somewhat so that it is not entirely stored upon crystallization and the primary shape cannot be restored at elevated temperature for reasonable observation times, It should be noted that the density of the PCO is smaller than that of hot water; hence, during strain recovery in the selected configuration, the polymer must fight buoyancy. Very recently, Landlein et al. reported shape memory properties of oligo (ε-caprolactone)/(n-butyl acrylate) copolymer (*Proc. Nat. Acad. Sci.* 2001, 98, 842-847). The authors demonstrated that shape recovery of the copolymer required 20 seconds to be completed at 70° C. Compared to their results, the cured PCO sample of the present disclosure exhibits quite rapid shape recoverability; however, testing was performed with distinct protocols so that a direct comparison is not feasible.

Figure 5:
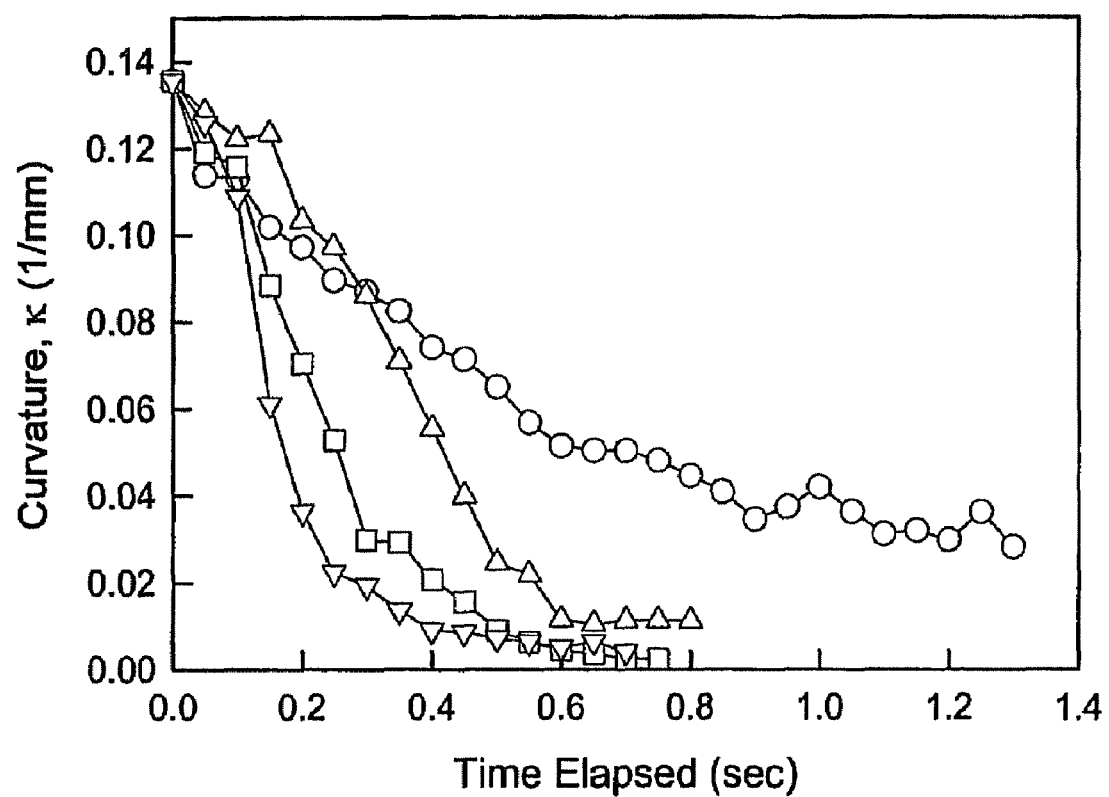
FIG. 5 graphically illustrates the curvature, κ, VS. time elapsed at T=70° C. at the following PCO5 weight percentages: (i) PCO5-0% (○), (ii) PCO5-1% (Δ), (iii) PCO5-2.5% (□), and (iv) PCO5-5% (∇).

In order to quantitatively evaluate the transition speed, the time evolution of curvature ($\kappa=1/r$, r=radius of circle superposing the curved film) for the recovering samples was determined by image processing and plotted versus time as shown in FIG. 5. By comparing the curvature relaxation plots for different samples, it is clear that neat PCO does not recover to the original shape of $\kappa=0$, at least not within five seconds (data beyond the plot range shown) while crosslinked PCO samples show shape memory behavior that is faster and more complete with increasing crosslink density. Of the samples tested, 5% peroxide shows the best shape memory behavior at 70° C. The chosen shape transformation was arbitrary; any other shape transformation within tensile strain limits set by material strength are possible, including coiled-to-flat, flat-to-coiled, concave-to-flat, matte-to-glossy, glossy-to-matte, to name a few. Considering the WAXS data presented summarized in Table 3, the speed of recovery (maximum slopes of plots in FIG. 5) increases with increasing degree of crystallinity, so long as the sample is crosslinked. Additionally, the extent of recovery increases with the degree of crystallinity up to 2.5% of DCP. Beyond this level of crosslinking, increases in crosslinking have little effect on the extent of recovery, suggesting the existence of an optimal DCP composition near 5 wt %.

In accordance with the invention, PCO polymers have been prepared with control over the cis/trans double bond composition and molecular weight afforded by the use of ruthenium catalysts. Samples of the polymers were cured using dicumyl peroxide of varying concentration and the influence of crosslinking on thermal, microstructural, and thermomechanical properties determined. In addition, the dependence of desirable shape memory characteristics on degree of crosslinking was investigated, revealing competing influences of crystallinity for shape-fixing, seen to decrease with crosslinking, and rubber elasticity above $T_m$, observed to increase with crosslinking as expected. While neat, linear, PCO does not exhibit shape memory effect due to the lack of a rubbery plateau above melt transition temperature, a small amount of peroxide crosslinking (~1%) imparts shape memory effect to PCO. A fast shape memory effect was observed for the crosslinked PCO that results when crystallization-fixed distorted samples were submerged in a warm water bath. In the case of PCO containing either 2.5 or 5% peroxide, complete shape recovery from a curvature, $\kappa=0.14$ $mm^{-1}$ to zero curvature occurs within 0.7 s at 70° C.

Various blends of PCO and other polymers including styrene butadiene, EVA and polyurethane using different ratios of the polymers in the blends were prepared and evaluated for isothermal characterization of the stiffness, thermomechanical melting and other properties per se and in comparison with PCO, EVA, SBR, polyurethane in unblended form.

Figure 6:
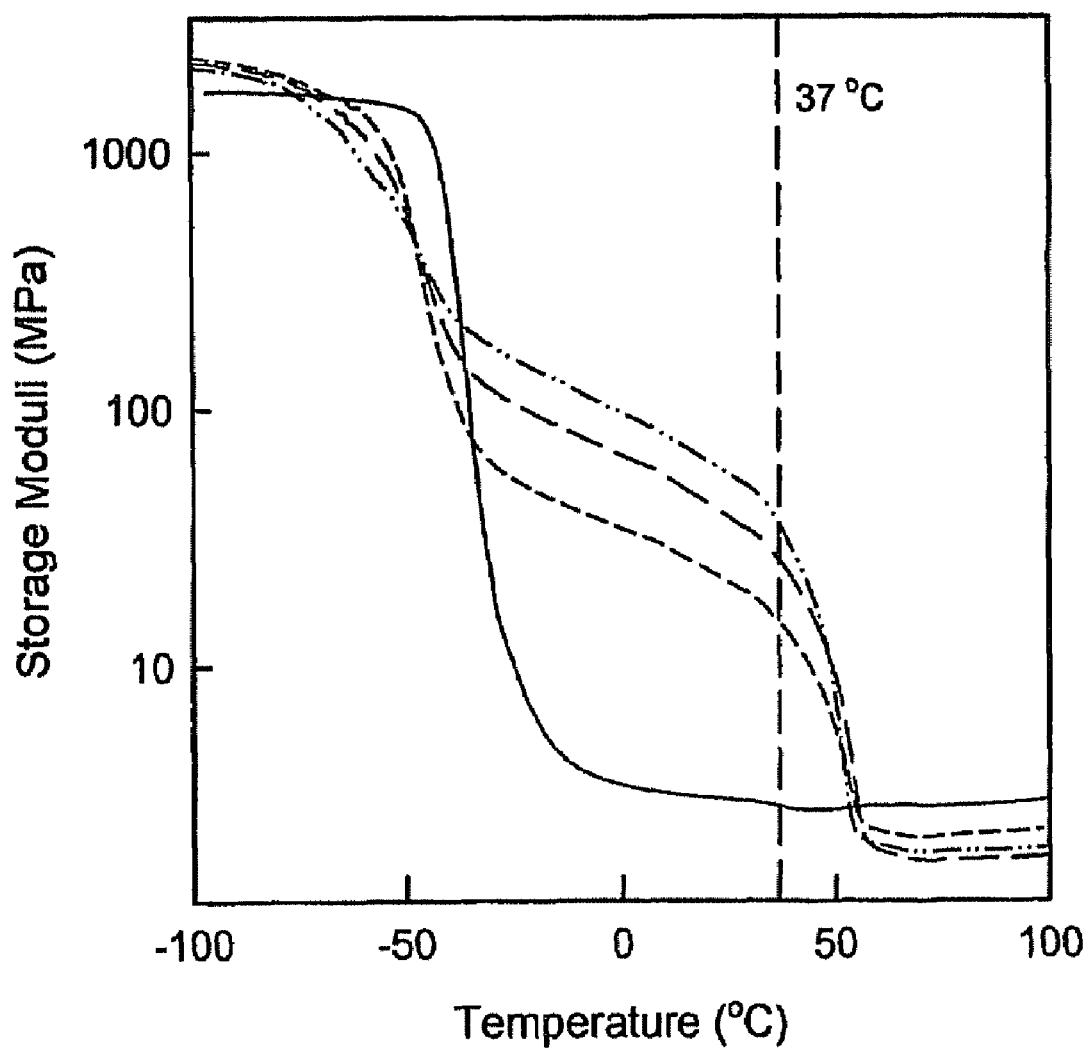
FIG. 6 illustrates thermomechanical characterizations of PCO:SBR blends of varying composition: (i) Solid line: SBR, (ii) Short dashes: PCO:SBR (40:60), (iii) Long dashes: PCO:SBR (60:40), (iv) Middle dashes: PCO:SBR (80:20).
Figure 7:
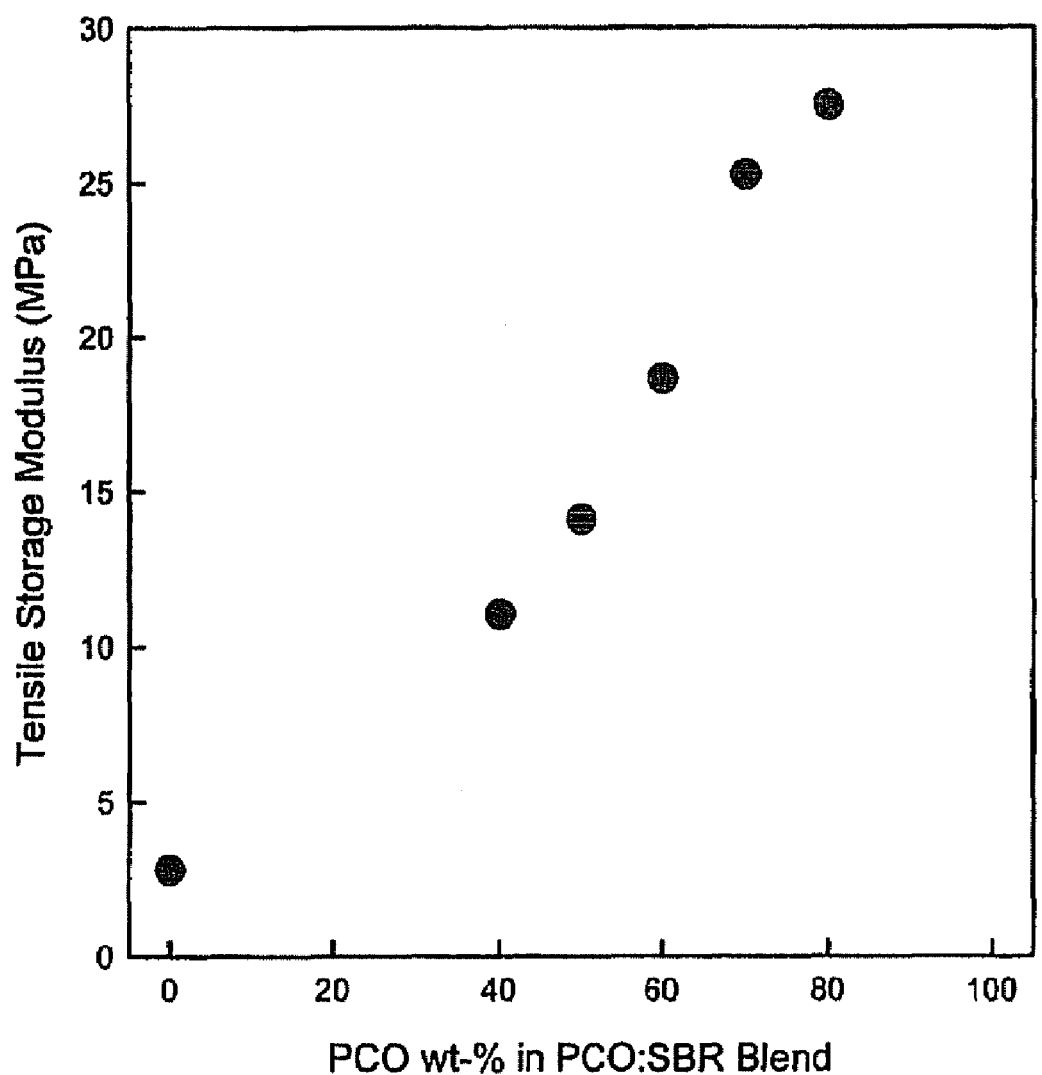
FIG. 7 graphically illustrates control or variation of tensile modulus at T=37° C. (body temperature) afforded through varying composition in PCO:SBR blends.

Modification of the Isothermal Stiffness on Blending with Styrene-butadiene Soft Rubber The storage moduli of the PCO blends using different ratios of SBR were determined and compared using the temperature-ramp and isothermal procedures. The results are shown in FIGS. 6 and 7. As shown in FIG. 6, at temperatures below the glass transition temperature, all of the blends have the same level of stiffness at about 2 GPa, and all the blends except the pure SBR have the same glass transitions at around −50° C. In the case where the PCO is the dominant component, it represents the continuous phase in the blend and the transition appears to be the glass transition of PCO. At temperatures above the glass transition, the blends evidence different stiffness values, the stiffeners decreasing with increasing amounts of the SBR component. The storage moduli at 37° C. of the blends are shown in FIG. 7. The results indicate that the stiffness decreases directly with the increasing ratio of SBR component, that is the SBR softens the PCO. The PCO appears to be totally immiscible with the SBR as in the blends investigated the PCO retains the same melting temperature. This conclusion reached is that when blending the PCO and SBR above the melting temperature of the PCO, the blends are white in color instead of being transparent. In this case, the critical temperatures and the stiffness of the rubber can be adjusted independently. The manner in which the SBR modifies the PCO at a temperature of 37° C. (body temperature) was also verified by the isothermal characterization. The trend appears to be linear with the weight fractions of PCO in the ranges investigated.

Modification of the Body-temperature Stiffness and Also the Transition Temperatures by Blending with Compatible Components.

Figure 8:
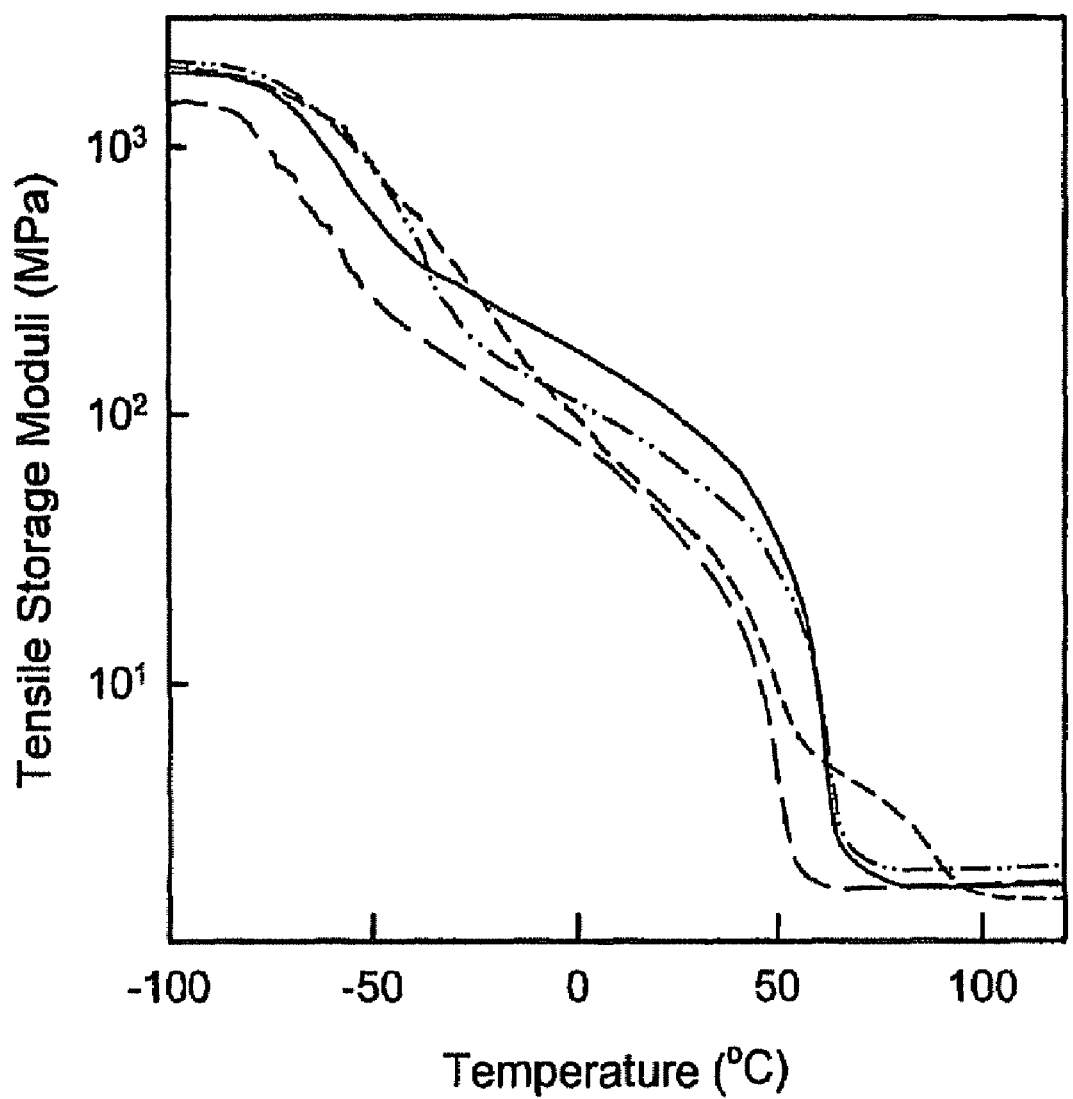
FIG. 8 illustrates graphically thermomechanical characterizations of PCO blended with various other polymers: (i) Solid line: PCO-8012, (ii) Dashes with double dots: PCO-8012:SBR (75:25), (iii) Short Dashes: PCO-0812:EVA (60:40), (iv) Long Dashes: PCO-8012:PCO-6213 (50:50).

PCO was blended with other components, including Vestenamer 6213, a PCO with different tacticity which has lower trans-content so that it decreases the melting temperature to below that of Vestenamer and EVA. Both components were compatible with PCO-8012 acted to lower the melting temperatures significantly, both from DMTA results (FIG. 8) and DSC results. This was to be expected as the PCO in the combination and its structures are almost the same except for the trans-cis content. However, the compatibility of EVA with PCO was unexpected. It is assumed that the miscibility results from the similarity of the ethylene portion and may change with variations of the ethylene content in the EVA. The DSC results obtained with PCO/EVA show that two melting stages exist, one for the PCO, and the other for the EVA. DMTA also results in two melting stages, as two stages of melting transitions and two level of plateaus are exhibited. This would indicate that a double network may exist in the blends and EVA may act as a crosslinking agent.

In addition to SBR, EVA and other PCO starting materials, shape memory polymers were prepared using various rubbery polyurethanes as the second material in the blend with similar results.

Figure 9:
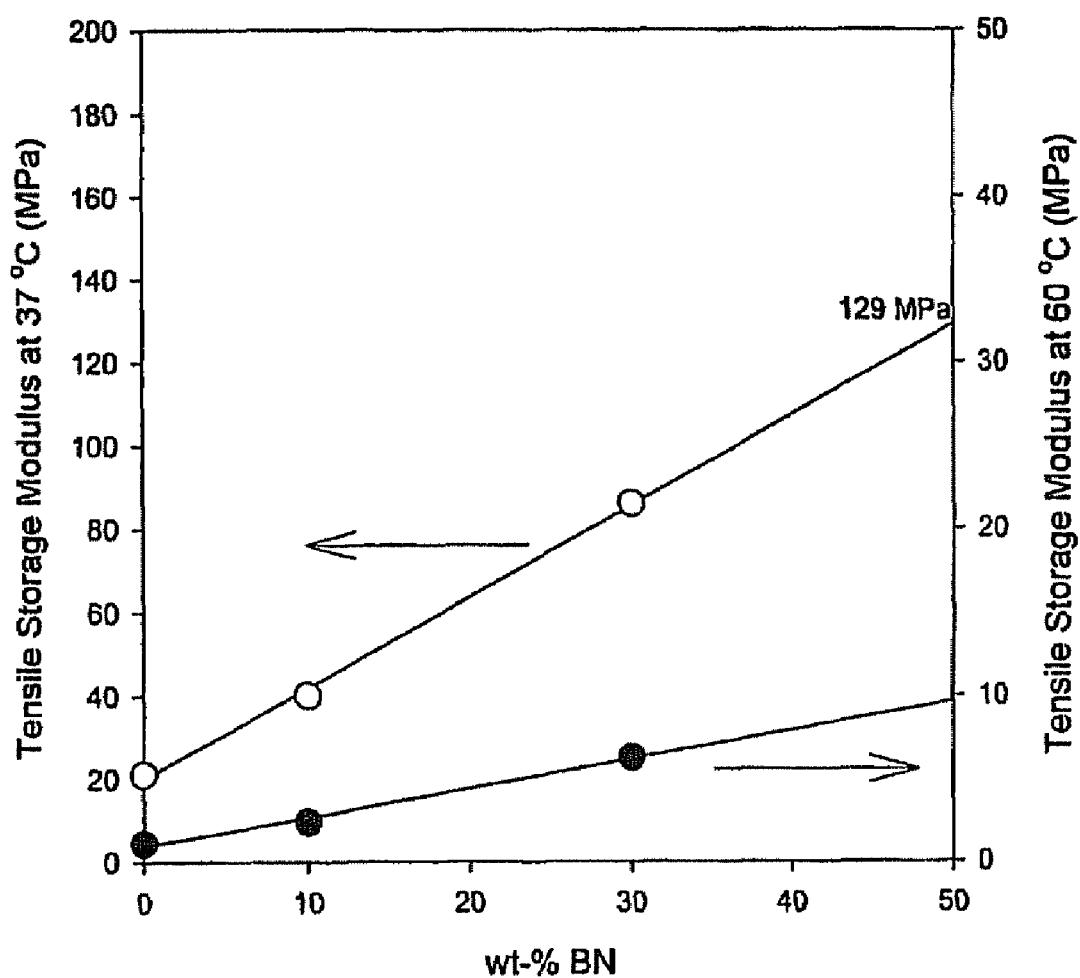
FIG. 9 illustrates augmentation of PCO tensile storage modulus at 37° C. (open) and 60° C. (filled) with amount of boron nitride (BN) filler added.

Also in accordance with the present disclosure, the body-temperature modulus of crosslinked PCO materials may be substantially increased through the addition of inorganic or organic filler powders. As an example, PCO (Vestenamer 8012®) was blended with different amounts of boron nitride (Advanced Ceramics, PT-140). Blending was conducted at T=80° C. for 10 minutes to ensure full mixing using a twin screw Brabender® mixer having a chamber volume of 30 ml. The rotating speed of the screws was set to 25 rpm. The materials were quite easily blended even at 30 wt % of the solid filler a finding attributed to the low viscosity of PCO, a processing aide itself. It is believed that a higher filler content (up to 50%) may be feasible for this system. The crosslinking agent used is dicumyl peroxide and the amount is 1 wt-PHR based on the amount of PCO added and not the PCO plus BN. The compounded materials were pressed and thermally cured in a heat press at 180° C. for 10 minutes under a load of 8 metric tons. The resulting films were smooth and egg-shell white in color. Shape memory tests in hot water (~80° C.) show fast and complete recovery. FIG. 9 shows the tensile storage modulus trends for body temperature (37° C.) and a temperature in the rubbery range (T=60° C.). It is clear that the filler allows controlled increase in modulus. The increase in modulus at body temperature may enable the satisfaction of stiffness requirements in biomedical applications, and in particular stents. The elevation in rubbery modulus increases the mechanical work capacity available during deployment, or in the return of a shape memory object from the temporary to permanent shapes. Many other fillers may afford tailoring of tensile storage modulus, tensile loss modulus, and linear strain (the strain beyond which elasticity is lost), including but not limited to: silica, titanium dioxide, montmorillonite clay, Kevlar™ staple, aluminum nitride, barium, and bismuth subcarbonate. Several of these fillers (barium and bismuth subcarbonate) can at the same time allow for radio-opacification. Addition of titanium dioxide simultaneously allows for strong UV absorption beneficial for laser cutting of fine shape memory articles.

Fillers of exceptionally high thermal conductivity, such as boron nitride, are expected to improve the rate of shape recovery in the shape memory effect by decreasing the time for the article to reach thermal homogeneity.

Thus, the present disclosure provides an advantageous shape memory polymer that includes chemically cross-linked polycyclooctene synthesized from cis-cyclooctene having a high trans double bond content. The present disclosure further provides an advantageous method of forming a shape memory polymer that includes conducting a ring opening metathesis polymerization of cis-cyclooctene in the presence of a Grubbs catalyst and reacting the polycyclooctene formed with dicumyl peroxide at an elevated temperature to cure the polycyclooctene.

Although the polymers and processing methodologies of the present disclosure have been described with reference to specific exemplary embodiments thereof, the present disclosure is not to be limited to such exemplary embodiments. Rather, as will be readily apparent to persons skilled in the art, the teachings of the present disclosure are susceptible to many implementations and/or applications, without departing from either the spirit or the scope of the present disclosure. Indeed, modifications and/or changes in the selection of specific polymers, polymer ratios, processing conditions, and end-use applications are contemplated hereby, and such modifications and/or changes are encompassed within the scope of the present invention as set forth by the claims which follow.

What is claimed is:

1. A method of forming a chemically crosslinked polycyclooctene, comprising:
   polymerizing cis-cyclooctene by ring-opening metathesis polymerization to form a polycyclooctene having a high trans double bond content; and
   chemically crosslinking the polycyclooctene;
   wherein the chemically crosslinked polycyclooctene has shape memory properties.

2. The method of claim 1, wherein the polycyclooctene prior to crosslinking has a trans double bond content of about 68 to about 81%.

3. The method of claim 1, wherein the polymerizing cis-cyclooctene is conducted in the presence of a Grubbs catalyst.

4. The method of claim 1, wherein the polymerizing cis-cyclooctene is conducted in the presence of a dihydroirnidazolylidene-modified Grubbs catalyst.

5. The method of claim 1, wherein the polycyclooctene prior to crosslinking has a molecular weight of about 120 to about 325 kilograms per mole.

6. The method of claim 1, wherein the chemically crosslinking the polycyclooctene comprises reacting the polycyclooctene with a peroxide.

7. The method of claim 1, wherein the chemically crosslinking the polycyclooctene comprises reacting the polycyclooctene with dicumyl peroxide.

8. The method of claim 1, wherein the polymerizing cis-cyclooctene is conducted in the presence of a Grubbs catalyst; and wherein the chemically crosslinking the polycyclooctene comprises reacting the polycyclooctene with dicumyl peroxide.

9. The method of claim 1, wherein the polycyclooctene prior to crosslinking exhibits a melting temperature of 19 to 61° C.

10. The method of claim 1, wherein the polycyclooctene prior to crosslinking exhibits a melting temperature of 30 to 60° C.

11. The method of claim 1, wherein the chemically crosslinked polycyclooctene exhibits a melting temperature of about 16 to about 61° C.

12. The method of claim 1, wherein the chemically crosslinked polycyclooctene exhibits a melting temperature of 38.2 to 55.2° C.

13. The method of claim 1, wherein the chemically crosslinked polycyclooctene exhibits a degree of crystallinity of 2.6 to 25.5 percent.

14. The method of claim 1, wherein the chemically crosslinked polycyclooctene exhibits a degree of crystallinity of 2.6 to 23.8 percent.

15. The method of claim 1, further comprising heating the chemically crosslinked polycyclooctene.

16. The method of claim 1, further comprising blending the chemically crosslinked polycyclooctene with a rubber.

17. The method of claim 16, wherein the rubber is selected from the group consisting of styrene-butadiene rubber, ethylene-pro pylene-diene (EPDM) rubber, natural rubber, poly (ethylene-co-vinyl acetate) (EVA), polydimethylsioxane (silicone), and polyurethane polymers.

18. A method of forming a chemically crosslinked polycyclooctene, comprising:
   polymerizing cis-cyclooctene by ring-opening metathesis polymerization to form a polycyclooctene; and
   chemically crosslinking the polycyclooctene;
   wherein the polycyclooctene prior to crosslinking has a trans double bond content sufficiently high to provide shape memory properties in the chemically crosslinked polycyclooctene.

19. The method of claim 18, further comprising heating the chemically crosslinked polycyclooctene.

20. The method of claim 18, further comprising blending the chemically crosslinked polycyclooctene with a rubber.

21. The method of claim 20, wherein the rubber is selected from the group consisting of styrene-butadiene rubber, ethylene-pro pylene-diene (EPDM) rubber, natural rubber, poly (ethylene-co-vinyl acetate) (EVA), polydimethylsioxane (silicone), and polyurethane polymers.

22. The method of claim 1, wherein the polycyclooctene prior to crosslinking has a trans double bond content of at least 68%.

23. The method of claim 18, wherein the polycyclooctene prior to crosslinking has a trans double bond content of at least 68%.

* * * * *